Aug. 30, 1927. 1,640,951
W. E. LEIBING
APPARATUS FOR CUBING SLICED MATERIAL
Filed Oct. 26, 1925 2 Sheets-Sheet 2
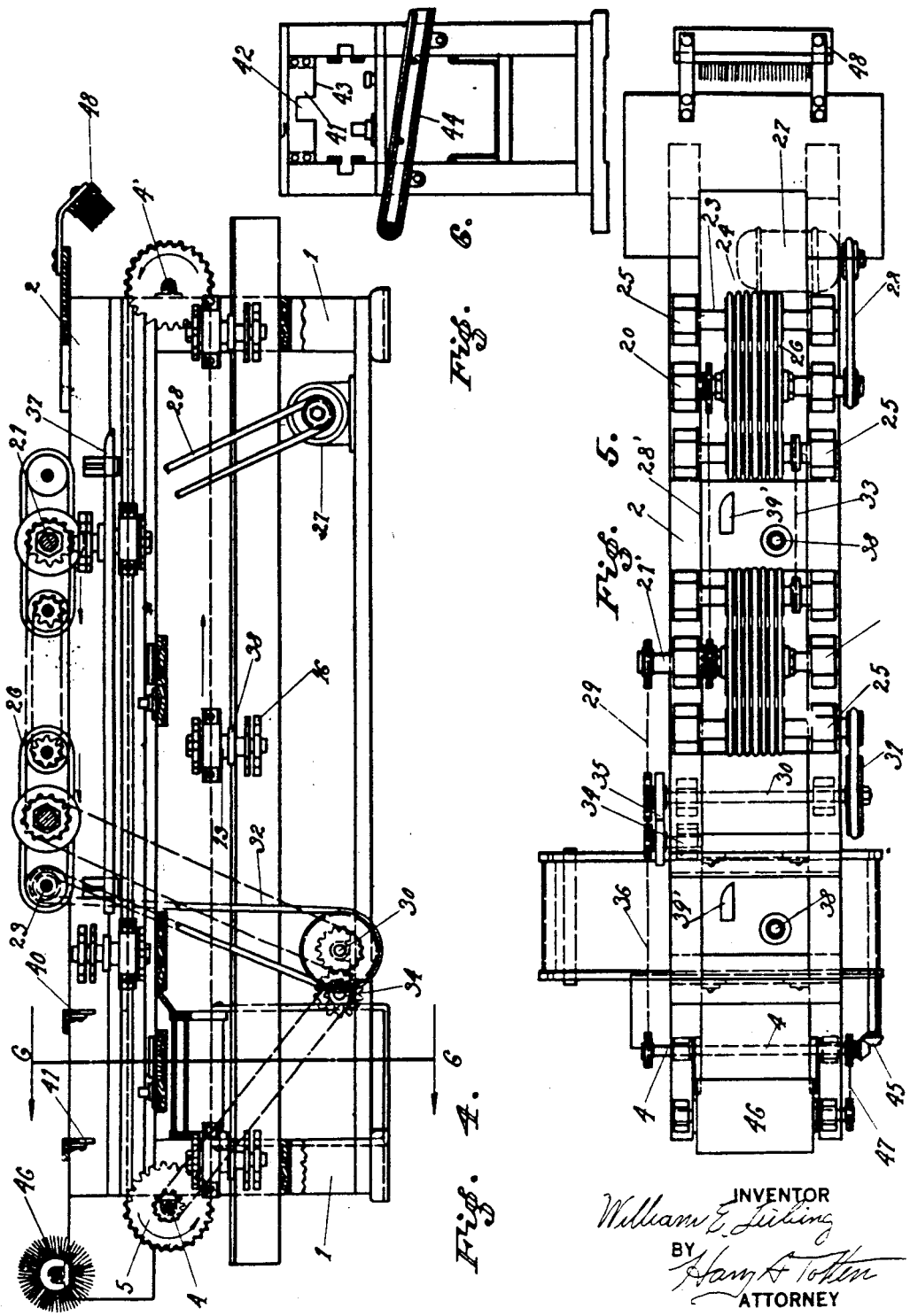
INVENTOR
William E. Leibing
BY
Harry H. Totten
ATTORNEY Patented Aug. 30, 1927.

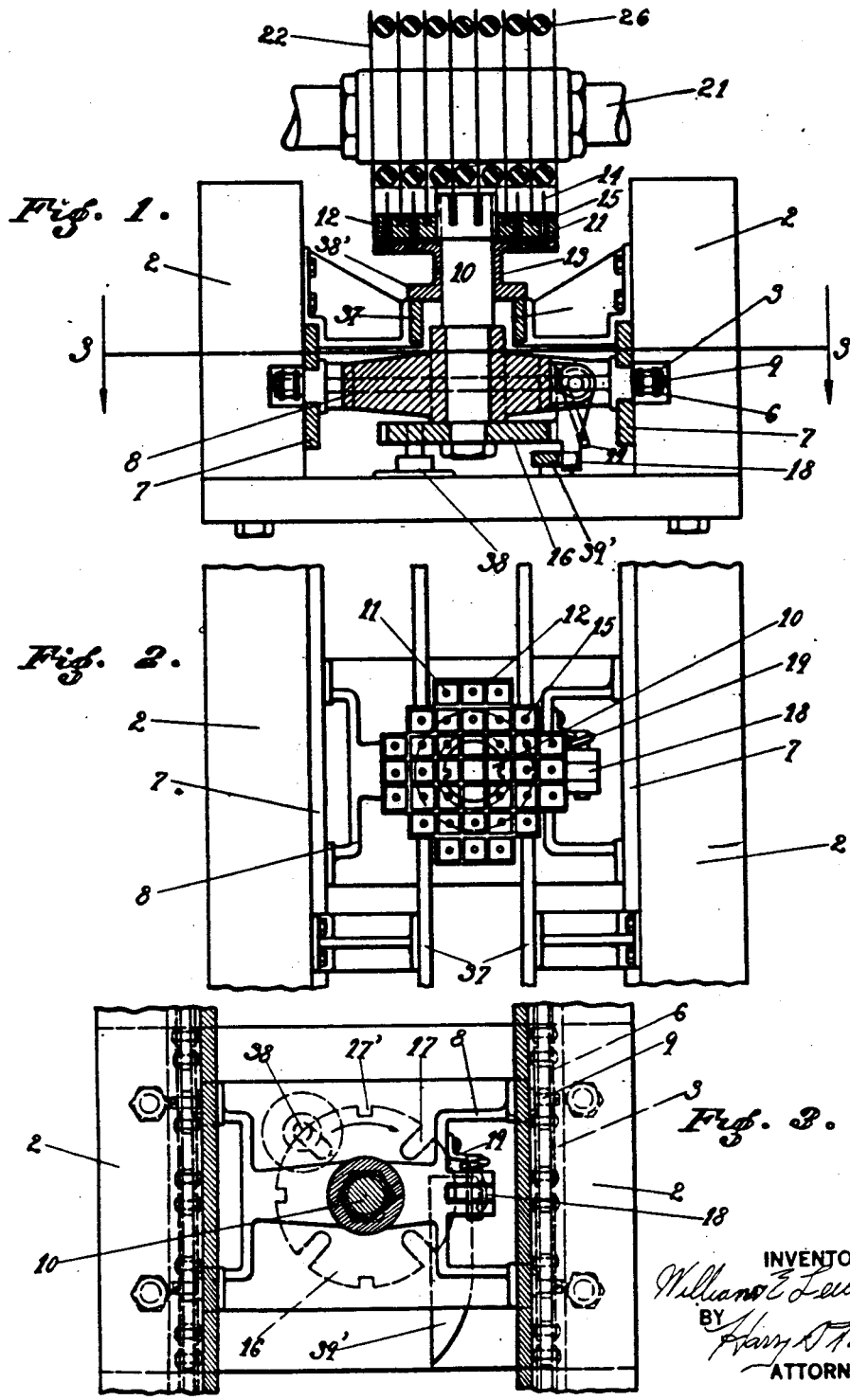

1,640,951

UNITED STATES PATENT OFFICE.

WILLIAM E. LEIBING, OF OAKLAND, CALIFORNIA, ASSIGNOR TO MAGNUS FRUIT PRODUCTS CO., OF SAN FRANCISCO, CALIFORNIA, A CORPORATION OF CALIFORNIA.

APPARATUS FOR CUBING SLICED MATERIAL.

Application filed October 26, 1925. Serial No. 64,822.

This invention relates to an apparatus whereby food stuffs, such as fruits and vegetables, may be cut or formed by mechanical means and automatically cut into a plurality of pieces of predetermined size and configuration, thereby dispensing with hand methods now employed for this purpose.

The invention, the embodiment of which is illustrated, is designed particularly for cubing slices of prepared pineapple, which operation has hitherto been costly, due to its having been performed manually, and due further to the fact of the slowness thereof. While the invention, as stated, is designed for cubing pineapple, it is to be understood that any material may be used therein which it is desired to cut into pieces of predetermined size and configuration.

The invention consists primarily in one or more turrets movable in fixed paths propelled by carriages, the turrets adapted to support material which cooperates, during the movement of the turret, with cutting devices so disposed and operated that the material as held on the turret surface is cut into pieces of predetermined size and configuration. In connection with this mechanism there is employed other means, minor details of the invention, for successively carrying out the cutting operation, the discharge of the cut material from the turrets, the operation of the turrets, and the cleaning of the surfaces of the turrets prior to the depositing of fresh material thereon, there being employed coacting parts operating in timed relation for carrying out the above operations in an efficient manner.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawing disclosing the preferred embodiment of this invention.

Fig. 1 is a view in vertical section through one of the turrets and its supporting carriage at its point of passing beneath certain of the cutting devices.

Fig. 2 is a view in top plan of one of the turrets removed from beneath a group of cutting devices.

Fig. 3 is a view in transverse section taken on line 3—3 Fig. 1 viewed in the direction of the arrows.

Fig. 4 is a view in longitudinal section of the assembled apparatus.

Fig. 5 is a view in top plan, and

Fig. 6 is a vertical sectional view on line 6—6 of Fig. 4, viewed in the direction of the arrows.

In the drawings wherein like characters of reference designate corresponding parts, the numerals 1 indicate the supporting standards of a frame, they carrying at their upper ends parallel frame members 2 provided on their inner faces with opposing channels 3. Shafts 4 and 4' are carried at the opposite ends of the frame in bearings and are disposed transversely of the frame at points below the opposite ends of the channels 3. The shafts 4 and 4' carry sprockets 5 around which extend the respective conveyer chains 6, the upper flight of each chain being movable longitudinally in the channels 3, Fig. 1. The guide tracks 7 are disposed parallel with the outer edges of the channels 3 and form between them guides for the opposite ends of the respective carriages 8, which are arranged throughout the length of the chains 6, the opposite sides of the respective carriages being connected with the respective chains through pintle connections 9, Figs. 1 and 3.

Each carriage rotatably supports a spindle 10, the latter extending preferably at right angles therethrough, its outer end carrying a turret 11, the upper surface of the turret being below the plane of the end of the spindle and formed on its outer face with intersecting grooves or channels 12, disposed in the disclosure at right angles to each other. Reciprocating on each spindle 10 beneath its associated turret is a sliding collar 13 mounting a plurality of impaling devices or pins 14 each of which is adapted for projection through an aperture 15 formed in the turret 11 preferably midway between the points of intersection of the grooves or channels 12. The projecting surface of the spindle 10 is grooved or channelled to align with the grooves or channels 12 in the upper surface of the turret. On the lower end of each spindle 10 is carried a radially slotted plate 16, alternate slots therein being preferably of greater depth than adjacent slots, as illustrated at 17, Fig. 3. In the slots 17', those of shallower depth, is received a plate locking pawl 18 carried by each carriage 8 and normally forced inwardly toward the periphery of the plate 16 by a spring 19.

Disposed transversely across the horizontal side frame members 2 at spaced points, as indicated in the drawings, with their ends rotatable in bearings 20 are cutter shafts 21 each carrying a plurality of parallel spaced cutting devices or disks 22 arranged in such manner that the peripheries thereof will be received in certain of the parallel grooves or channels 12 on the passage of the respective turrets beneath the same, in their movement longitudinally of the frame in the hereinafter described manner.

Disposed parallel with the respective shafts 21 and arranged one on each side thereof, are other shafts 23 carrying grooved drums 24 and their ends rotatable in bearings 25. The grooved drums 24 of the respective shafts associated with each shaft 21 support a plurality of endless flexible members 26 arranged to pass between the adjacent cutting disks or members 22, as illustrated in Figs. 1 and 5.

The power means for driving the respective parts is illustrated as consisting of a motor 27 connected through a belt 28 with a pulley on one of the shafts 21, the latter driving the other shaft 21' through a flexible connection 28'. The shaft 21 which is driven through its associated shaft by a connection 28' drives through a flexible connection 29, a countershaft 30 disposed transversely of the frame.

At one end the shaft 30 carries a grooved drum 31 which drives, through a cross belt 32, one of the shafts 23 supporting the drum for operating one group of the flexible members 26, and this driven group of flexible members operates its adjacent group of flexible members through a flexible driving member 33 driving adjacent shafts 23, as in Fig. 5. The stub shaft 34 has driving connection through intermeshing gears 35 with shaft 30, and said stub shaft drives the shaft 4 through a flexible, preferably chain connection, 36. It will be observed that the motor 27 drives all moving parts of the mechanism, the carriages and conveying chains moving in the direction of the arrows, Fig. 4, and the flexible members 26 in the direction of the arrows associated therewith, in Fig. 4.

To cause the impaling devices or pins 14 to project upwardly through the apertures 15 in the respective turrets 11 at such time as the turrets pass beneath the successive groups of cutting devices 22, lifting rails 37 are disposed in parallel relation between the members 2 beneath the respective cutting devices. The movement of the carriages by the conveying chains causes the flanges 38 of the collars 13 to ride on the upper surface of the members 37 until such time as the turrets pass successively from beneath the last group of cutting devices in their direction of travel.

To impart a partial rotation to the turrets as they pass successively from beneath the first group of cutting devices, I provide a turret rotating pin 38 between the shafts 21 in the path of travel of the plate 16, the pin being received in registering slots 17 of successive plates during their movement and causing a quarter rotation of the turret. At this time, the pawl 18 has been released from its cooperating depression 17' due to its end riding on the release rail 39'. Thus it will be observed that the turrets are locked from rotation at all times except when the pawls 18 are released from their associated slots 17' to admit of the action of pins 38 to impart rotation to the turrets through the operation of the plates 16.

In operation, an attendant located adjacent the end of the apparatus carrying the motor 27, deposits on each turret 11, as they successively are presented, a slice of material, in this case pineapple, each slice being centered on its respective turret by positioning the aperture in the slice of pineapple to receive the projecting portion of the spindle 10. Continued movement of the carriage causes the turret to pass beneath the flexible members 26 moving in the same direction as the turret, which members bear on the upper surface of the slice and hold the same firmly to the turret surface. At this time, the flange 38 of the collar 13 has commenced its riding action on the rails 37 forcing the impaling device 14 upwardly through the slice at a plurality of points. Continued movement of the conveyer and its turret subjects the slice to the action of the first set of cutting members 22, and in passing beneath the same a slice is cut transversely in a number of parallel strips. After emerging from beneath the first set of cutting devices 22 and associated flexible members 26, the pawl 18 is acted on by the release 39 and is withdrawn from its associated slots 17', enabling the pin 38 which is received in one of the slots 17 in register therewith to impart a one quarter revolution to the turret, after which time the pawl 18 locks the plate in its new position. Continued movement of the carriage and turret causes the same to pass beneath the second group of flexible members 26 and cutting device 22, the action of the latter being to cut the slice angularly of the first cut, in the present instance at right angles to the first cut producing a number of polygonal pieces. After this second cut is performed, continued movement of the carriage and turret causes the flange 38' of collar 13 to ride from the rear end of the rails 37, the weight of the collar withdrawing the impaling devices from within the polygonal pieces.

To remove the polygonal pieces from the upper surface of the turrets as the same successively pass from beneath the second group of cutting members 22, I provide a pair of scrapers 40 and 41 disposed transversely of the members 2 in spaced relation at one end of the frame, see Fig. 6. Each of these members is provided with an undercut recess 42 for receiving the upstanding portion of the spindle 10 and admitting of the lower edge 43 of the respective scrapers to lie in slight spaced relation to the upper surface of the turret as the same passes therebeneath. Between the scrapers 40 and 41 are positioned a pawl release rail 39' and a turret rotating pin 38, the same being duplicates of the members 39' and 38 positioned between the first and second groups of cutting members 22. These latter members 38 and 39' act to impart a one quarter rotation to the turret after the same has passed beneath the scraper 40 and prior to passing beneath the scraper 41. This rotation presents to the scraper 41 for removal that portion of the polygonal pieces which passed the undercut 42 in the scraper 40. The polygonal pieces as scraped from the surface of successive turrets drop on a transversely disposed endless belt conveyer 44 beneath said scrapers, which conveyer is operated through a bevelled gear connection 45 from one end of the shaft 4.

To maintain the surface of the turrets free of foreign material, the same after passing beneath the scraper 41 are acted on by a revolving brush 46 driven from the shaft 4 by a flexible connection 47, and prior to receiving material placed thereon by the attendant they are also acted on by the stationary cleaning brush 48 beneath and in contact with which the same are caused to pass.

Having thus described my invention, what I claim as new and desire to protect by Letters Patent of the United States is:—

1. In combination a turret provided with an article centering member and for receiving and supporting a slice of material provided with a center recess within which is received said centering member, and cutting devices for acting on the supported slice for cutting the same into a plurality of polygonal pieces.

2. A turret provided with a relatively flat surface formed with a plurality of intersecting grooves and the turret being further provided with a plurality of apertures extending therethrough intermediate the intersecting points of said grooves. a movable carriage for a turret, a turret carrying spindle projecting from the carriage affording rotation for the turret, means for moving the carriage, article impaling pins projecting through said apertures, and a support for said pins movable between the turret and carriage.

3. In combination a movable turret for receiving and supporting directly on its surface a slice of material, devices for cutting the supported slice into a plurality of polygonal pieces, and impaling devices associated with the turret for retaining the slice thereon during the cutting of the polygonal pieces, said impaling devices being movable from the polygonal pieces after their formation.

4. In combination with a movable turret for receiving and supporting on its surface a slice to be cut, a plurality of spaced rotary cutters for cutting the supported slice into a plurality of polygonal pieces, endless flexible devices between the cutters for acting on the slice to hold the same to the turret surface during its cutting.

In testimony whereof I have signed my name to this specification.

WILLIAM E. LEIBING.